United States Patent [19]

Chin-Chi

[11] 4,280,821
[45] Jul. 28, 1981

[54] DISINTEGRABLE LUMP ABRASIVE GRAINS AND PROCESS FOR PRODUCING SAME

[76] Inventor: Liao Chin-Chi, No. 42, Chi Shih St., Tai-Chung City, Taiwan

[21] Appl. No.: 81,116

[22] Filed: Oct. 2, 1979

[51] Int. Cl.$^3$ .............................................. C09K 3/14
[52] U.S. Cl. ...................................... 51/298; 51/302; 51/303; 51/307; 51/308
[58] Field of Search ................. 51/298, 302, 303, 307, 51/308

[56] References Cited

U.S. PATENT DOCUMENTS

| | | | |
|---|---|---|---|
| 246,958 | 9/1881 | Levett | 51/302 |
| 2,075,362 | 3/1937 | Selleck et al. | 51/302 |
| 3,071,455 | 1/1963 | Harman et al. | 51/308 |
| 4,161,394 | 7/1979 | Regan | 51/298 |

Primary Examiner—Donald E. Czaja
Assistant Examiner—W. Thompson
Attorney, Agent, or Firm—Robert E. Burns; Emmanuel J. Lobato; Bruce L. Adams

[57] ABSTRACT

This invention relates to the manufacturing of a special "lump abrasive grains", which is to be used as polishing agent and in buffing compound. Basically, the production is composed of gypsum ($CASO_4 \cdot \frac{1}{2}H_2O$), acting as a base carrier, and a certain kind of abrasive grains (e.g. emery, garnet or alumina), which is adopted in proper quantity and in regular size according to the polishing effect or purpose desired. Then by mixing with binder (e.g. water glass, methyl cellulose, glue, PVA, PVAC) and solidifying with water, new abrasive grains are aggregated in lump. As with its special nature, this new product will thereafter be easily processed into any extent of hardness, any particle size and shape as required.

The main characteristics of this invention is illustrated as: during the instant of grinding, the lump grains are split into small lumps; and then ground into evenly fine grains so as to be able to extend the contact time and enforce grinding. Thus, the abrasive grains can fully operate with the most durable and sharp polishing effects.

7 Claims, 3 Drawing Figures

DISINTEGRABLE LUMP ABRASIVE GRAINS AND PROCESS FOR PRODUCING SAME

BACKGROUND OF THE INVENTION

In view that this product possesses the characteristics of the natural "TRIPOLI", it can, in scale of cost saving, replace the expensive TRIPOLI as a basic abrasive material. Meanwhile, as the size, shape and hardness of this product can be adjusfed by manual processing to meet the practical requirements, it is more effective and useful than natural TRIPOLI in some aspect.

SUMMARY OF THE INVENTION

This invention is aimed at the introduction of a special manufacturing method to bring forth new "lump abrasive grains", used in polishing. This method will offer special effect when it is applied in a buffing compound and as a polishing agent. Normally, when a buffing compound used in polishing contains basic abrasive grains such as:

silicon sand, garnet, emery, tripoli, alumina, silicone carbide $Fe_2O_3$, $Cr_2O_3$ ... etc.

it is constantly adjusted in composition, due to the diverse materials, in hardness, shape, tenacity and diameter to meet the practical processing requirements. By checking with a microscope, the shapes of these basic abrasive materials are shown in multiangular and irregular crystals forms; and the defect of these materials is their loose construction, which causes the grains to be immediately split into fine granules on the moment of buffing contact so as to be unable to fully utilize the effects of each grain.

DETAILED DESCRIPTION OF THE PREFERRED EMBODIMENT

This invention is aimed at avoiding the defects of customary abrasive grains and provides a special manufacturing method of lump abrasive grains. The method uses gypsum ($CASO_4.\frac{1}{2}H_2O$) as the base carrier and, according to the diverse polishing purposes, combines with appropriate abrasive grains (Such as Emery or Alumina) as basic materials, which should be selected in proper grain size. Then by mixing with a portion of binder (such as glue glass, M.C, water, PVA, PVAC etc.) and solidifying with water, new abrasive grains are produced. Due to their special nature of softness, hardness and granularity, the new grains appear to aggregate into lumps. Thus as stated, the main purpose of this invention is to make the abrasive grains in lump form, just by mixing with gypsum and binder, such as water glass, PVA etc., so that in the course of grinding, the lump grains can be ground into small lumps firstly, and then into evenly fine granules. In this respect, the contact chance between the abrasive grains and the articles is increased. The desired polishing effect is well achieved, while unnecessary loss can be also minimized.

The second speciality of this invention is to be able to control the abrasive grains in any hardness, shape, tenacity and size for practical requirements.

Another advantage is cost saving. As sharing the same characteristics as Tripoli, the new products can replace Natural Tripoli as a basic abrasive material for polishing.

In order to provide further understanding in this respect, herewith enclosed figures and table, the basic formula, manufacturing process and variation of abrasive grains referred to this invention are described in detail as follows,

| I. Basic formula | |
| --- | --- |
| Gypsum ($CASO_4 . \frac{1}{2}H_2O$) | 100 portion |
| Basic abrasive materials (Emery, Alumina amd silicon sand etc. in appropriate size) | 30-300 portion |
| Binder (water glass, M.C, glue, PVA, PVAC... etc.) | 0.2-30 portion (0.1-8%) |
| Water | Proper in portion |

P.S.

1. The variaties of basic abrasive materials are prepared in accordance with the diversity of usages. Any natural and synthetic abrasive grains is useable, the applicable scope of particle size is in range of #40-190 8,000.
2. The variety and dosage of binder are used in accordance with the required loose, shape, size, etc.

Figure 1:
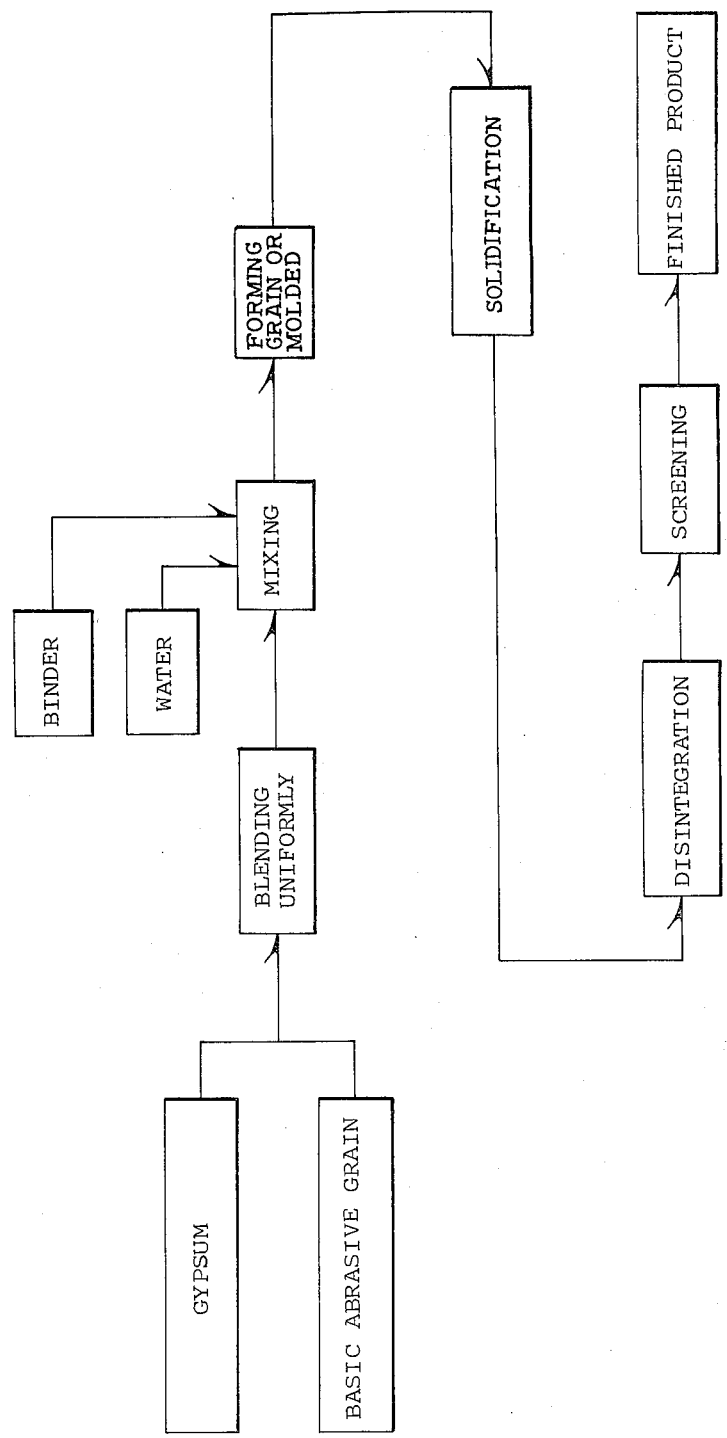
FIG. 1 shows the manufacturing process of the invention.

II. Manufacturing process: (see FIG. 1.)

After evenly stirring and mixing of gypsum and basic abrasive grains, add binder (water glass ... etc.) and water to solidify; then, grind again and screen to proper size, the product is made.

Figure 2:
FIG. 2 shows ordinary basic abrasive grains before and after grinding under a microscope.
Figure 3:
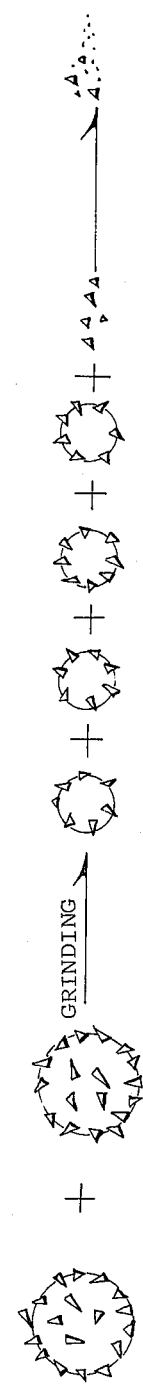
FIG. 3 shows basic abrasive grains of the invention prior to and after grinding under a microscope.

III. The comparison in composition, shape and specialities between general abrasive grains and the subject invention grains.

a. general abrasive grains: (see FIG. 2.)
1. Basic shape: in form of multiangular or irregular crystals
2. Before grinding: grains are evenly spread over basic materials.
3. Grinding variation; the ground grains are directly split into fine granules.

b. Subject invention grains (see FIG. 3.)
1. Basic shape: in irregular lump form
2. Before grinding: the basic abrasive grains are evenly adhered to the lump basic carrier material.
3. Grinding variation: lump grains is firstly ground into small lumps, and then into evenly fine granules.

Owing to the grain construction specially formed in lumps, the grinding contact time can be prolonged during the actual grinding operation so that the basic abrasive grains are more durable and have better polishing effect. For instance, as the traditional abrasive grains are coated on a buffing wheel, they will be immediately disintegrated into uniform tiny grains during the grinding operation. For each abrasive grain —(A), it can exert polish working only once. If the abrasive grain does not work as a polishing medium at the first instant, it will never have another chance. But the present invention provides a lump of grinding grains and a certain abrasive grain —(A) in the lump —(B) disintegrates into several smaller lumps —(B₁) after the first contact with the article being polished. Since its form is still in lump, it will continue its function. As the lumps repeatedly split in this way, each grain in a lump will polish for several times. Simply speaking, each abrasive grain has more chances to contact with the article being polished.

Meanwhile, tripoli has an extensive scope of application such as in making matches, polishing agent, filtering medium, fire-proof agent and so on and is a necessary material in industry. The invention hereof has same property as natural tripoli for using as an abrasive material. Furthermore, the size, shape and hardness of its finished products can be adjusted during preparation in order to meet factual need and its scope of application is much larger than that of natural tripoli as an abrasive material.

I claim:

1. Process of producing an abrasive composition in lump form for use as polishing and buffing agent, comprising the steps of:
   uniformly mixing grains of abrasive material with gypsum,
   adding water and a binder selected from the group consisting of water glass, methyl cellulose, glue, polyvinyl alcohol and polyvinyl acetate to solidify the mixture,
   disintegrating the solidified mixture to produce lumps containing said grains of abrasive material, and
   screening said lumps to selected size.

2. A process according to claim 1, in which the composition is composed of 100 portions of gypsum, 30 to 300 portions of basic abrasive material, 0.2 to 30 portions of binding agent and sufficient water for solidification.

3. A process according to claim 1 or 2, in which the abrasive material is selected from the group consisting of silicon sand, garnet, emery, tripoli, alumina, silicon carbide, $Fe_2O_3$ and $Cr_2O_3$.

4. A process according to claim 3, in which the size of the grains of said abrasive material is between #40 and #8,000.

5. Abrasive composition in lump form made by the process of claim 1.

6. Abrasive composition in lump form made by the process of claim 2.

7. Abrasive composition in lump form made by the process of claim 3.

* * * * *

UNITED STATES PATENT AND TRADEMARK OFFICE
CERTIFICATE OF CORRECTION

PATENT NO. : 4,280,821
DATED : July 28, 1981
INVENTOR(S) : Chin-Chi Liao

It is certified that error appears in the above—identified patent and that said Letters Patent are hereby corrected as shown below:

Please correct inventor's name so that his first and last name appears as follows: CHIN-CHI LIAO --Chin-Chi Liao-- instead of "Liao Chin-Chi"

Signed and Sealed this

Third Day of November 1981

[SEAL]

Attest:

Attesting Officer

GERALD J. MOSSINGHOFF

Commissioner of Patents and Trademarks